United States Patent [19]

Sheng-Huei

[11] Patent Number: 4,893,143
[45] Date of Patent: Jan. 9, 1990

[54] LENS BASE AND ITS ACCESSORIES FOR ANY COMPACT AUTOMATIC CAMERA

[76] Inventor: Wey Sheng-Huei, No. 26 Chiu-Lung Street, Kang-Shan Town, Kaohsiung Hsien, Taiwan

[21] Appl. No.: 245,160
[22] Filed: Sep. 16, 1988
[51] Int. Cl.⁴ .............................................. G03B 17/00
[52] U.S. Cl. ................................... 354/286; 354/295; 350/257; 350/318
[58] Field of Search ...................... 354/286, 295, 296; 350/252, 257, 318

[56] References Cited

U.S. PATENT DOCUMENTS

| | | | |
|---|---|---|---|
| 3,961,349 | 6/1976 | Forsyth et al. | 354/295 |
| 4,219,264 | 8/1980 | Rodeck | 354/295 X |
| 4,291,944 | 9/1981 | Nomura | 350/257 |
| 4,327,984 | 5/1982 | Evans | 354/295 X |
| 4,728,973 | 3/1988 | Taniguchi et al | 354/286 X |

Primary Examiner—L. T. Hix
Assistant Examiner—Brian W. Brown
Attorney, Agent, or Firm—Kirschstein, Ottinger, Israel & Schiffmiller

[57] ABSTRACT

A lens base and its accessories for any compact automatic camera. The lens base consists of a guiding ring, an outer cylindrical ring, an inner cylindrical ring and a positioning ring for settling a special lens and/or a color filter thereon and the accessories include a connecting base, a combining frame, a bottom plate and a fixing button for sustaining the lens base and combining with any compact automatic camera with or without a self-timer.

10 Claims, 3 Drawing Sheets

LENS BASE AND ITS ACCESSORIES FOR ANY COMPACT AUTOMATIC CAMERA

BACKGROUND OF THE INVENTION

Today compact automatic cameras are very popular, but generally lack lens bases for mounting different special lenses such as wide-angle, fish-eye, telephoto, macro ones, and so on. Although some have special accessories for this purpose, they are different in their size and shape so that they are not usable for other kinds of compact cameras. Therefore, this lens base and its accessories have been devised, and are applicable for any kind of compact camera on the market nowadays. The purposes of this invention are described as follows.

1. To supply a lens base adaptable to any compact automatic camera for mounting different lenses.
2. To supply a lens base able to be adjusted in its position upward, downward, leftward, rightward, forward or backward to apply it to any compact automatic camera.
3. To supply a lens base able to freely change a lens or a color filter and at the same time to adjust the focus distance for taking a picture with different extent of sharpness or blur.
4. To supply a lens base able to turn idle the lens or the color filter mounted therein for changing the angle and the scope of the background.
5. To supply a lens base provided with accessories being selectably mounted on a camera having a self-timer or not.

SUMMARY OF THE INVENTION

This invention, comprising a lens base and its accessories, can be applied to any kind of compact automatic camera with or without a self-timer and uses a special lens. This invention provides the functions of microadjusting the focus distance, easy changing of the special lens to be used and versatile adjusting of the position of the lens base upward, downward, leftward, rightward, forward or backward to suit the size or the shape of the camera.

The lens base includes a guiding ring, an outer cylindrical ring, an inner cylindrical ring and a positioning ring. The special lens to be used for taking picutres is settled in the inner cylindrical ring and then the positioning ring is combined with the front of the inner cylindrical ring to hold the lens in its place. Then the inner cylindrical ring is combined with the outer cylindrical ring by means of male and female threads, whereby the position of said inner ring can be adjusted in relation to the outer ring. The guiding ring is then combined with the outer ring also by means of male and female threads, and the rear end of the guiding ring is combined with a connecting base or a connecting plate of a combining frame of the accessories.

The accessories include a connecting base, a combining frame, a bottom plate and a fixing button. If the camera to mount this lens base does not have a self-timer, only the connecting base has to be used to combine the lens base on the camera. However, if the camera has a self-timer, the combining frame, the bottom plate and the fixing button should be used instead of the connectinb base.

The connecting base has to be stuck tightly on the camera with a Scotch (trademark) tape and is provided with two vertical parallel inserting grooves to be inserted by two parallel edges on the guiding ring of the lens base for combining the lens base with the connecting base.

The combining frame is provided with a connecting plate having two vertical parallel inserting grooves to be inserted by said two parallel protruding edges of the guiding ring for combining the lens base with the combining frame. Then the combining frame is combined with the bottom plate which is to be combined with the camera at its bottom with the fixing button screwed in the tripod socket of the camera.

DETAILED DESCRIPTION OF THE INVENTION

Figure 1:
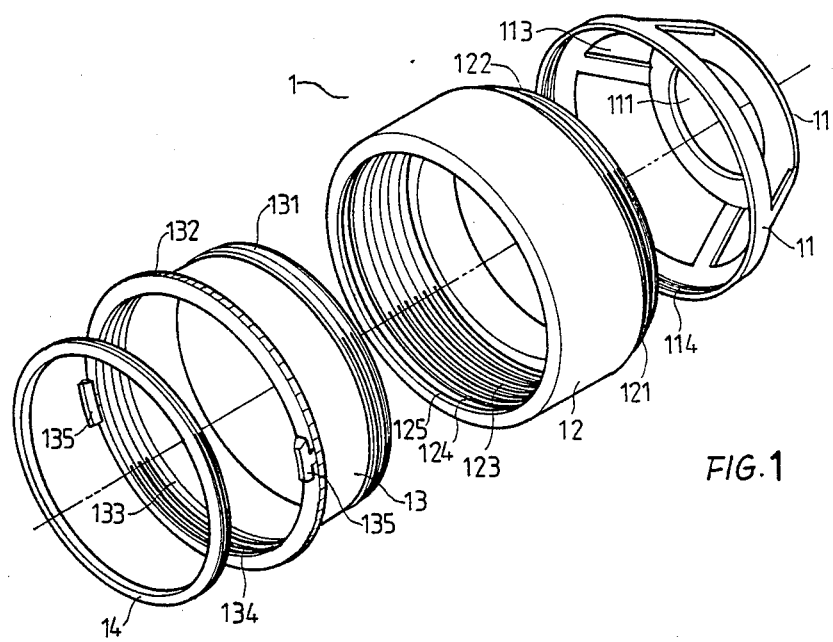
FIG. 1 is an exploded perspective view of the lens base in accordance with the present invention.
Figure 2:
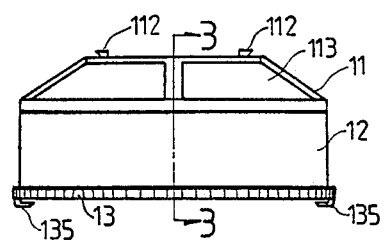
FIG. 2 is an upside view of the lens base in accordance with the present invention.

First, the lens base 1 for a compact automatic camera comprises a guiding ring 11, an outer cylindrical ring 12, an inner cylindrical ring 13 and a positioning ring 14 as shown in FIGS. 1 and 2.

The guiding ring 11 is provided with a central hole 111 at the rear end, two protruding parallel edges 112 on the rear end face for combining the guiding ring 11 with a connecting base or a combining frame of the accessories, viewing holes 113 in the tapered circumferential face for the automatic exposure metering window to see through, and female threads 114 on the inner circumferential face of the front for screwing with male threads 121 of the outer cylindrical ring 12.

The outer cylindrical ring 12 is provided with two stages of male threads 121 and 122 at the rear section, female threeads 123 at the middle inner section, an inner idle turning face section 124 and an anti-falling rim 125 at the front section. The male threads 121 screw with the female threads 114 for both the guiding ring 11 and the outer cylindrical ring 12 to combine together, and the male threads 122 screw with the female threads on the lens ring of a camera. The female threads 123 at the middle inner section has four round for combining the outer cylindrical ring 12 with the inner cylindrical ring 13. The inner idel turning face section 124 is of a little larger diameter than the female threads 123 and abuts outward on said threads 123. The anti-falling rim 125 is provided at the front end protruding inward and has a smaller diameter than said threads 123 lest the inner cylindrical ring 13 should move out of said rim 125 after said ring 13 has forcedly been pushed through said rim 125 so as to combine the both rings 12 and 13 together. Then a male-threaded face 131 of said ring 13 can either turn idle at the idle turning face section 124 or can screw with the female threads 123 for any number of rounds.

The inner cylindrical ring 13 is provided with four rounds of male threads 131 at the rear section to screw with the female threads 123, and the male threads 131 have a diameter larger than that of the anti-falling rim 125 of the outer cylindrical ring 12, smaller than that of the idle turning face section 124, and the same as that of the female threads 123; then the inner cylindrical ring 13 can turn idel or be adjusted in distance in relation with the outer cylindrical ring 12 by screwing in or out as described above. Said ring 13 is also provided with a rough-faced protrucding edge 132 at the front end for being held with fingers in turning said ring 13. The length of said ring 13 is the same as that from the front end to the end of the female threads 123 of the outer ring 12, and the inner diameter of the rear section of said ring 13 is as long as that of the rear section of the outer ring 12, but is shorter than that of the front section of said ring 13. There is an inner face 133 for a special lens 4 to rest against in case the lens 4 is temporarily fitted on said ring 13. Besides, female threads 134 are provided at the inner front section of said ring 13 for the positioning ring 14 to screw with for positioning the lens 4. In addition, two protrusions 135 are provided at both sides on the front end face of said ring 13 for settling a color filter 5.

Next, the accessories comprise a connecting base 2, a combining frame 3, a bottom plate 33 and a fixing button 34.

Figure 4:
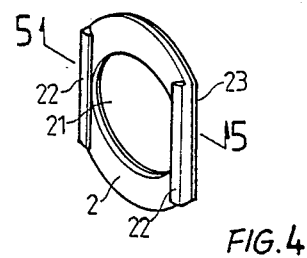
FIG. 4 is a perspective view of the connecting base in accordance with the present invention.
Figure 3:
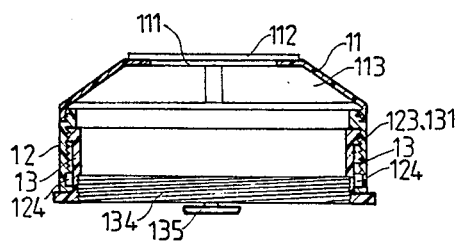
FIG. 3 is a cross-sectional view on line 3—3 line of FIG. 2.
Figure 5:
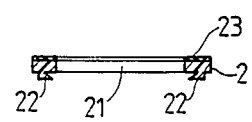
FIG. 5 is a cross-sectional view on line 5—5 of FIG. 4.
Figure 6:
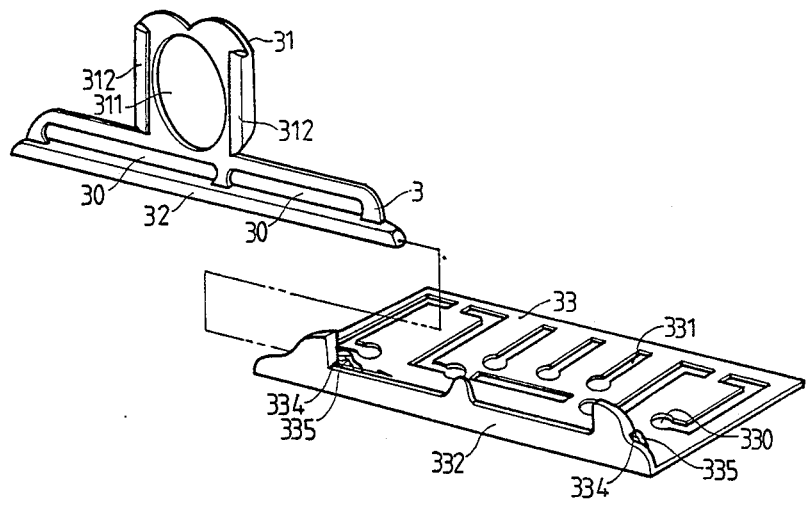
FIG. 6 is an exploded perspective view of the combining frame and the bottom plate in accordance with the present invention.
Figure 7:
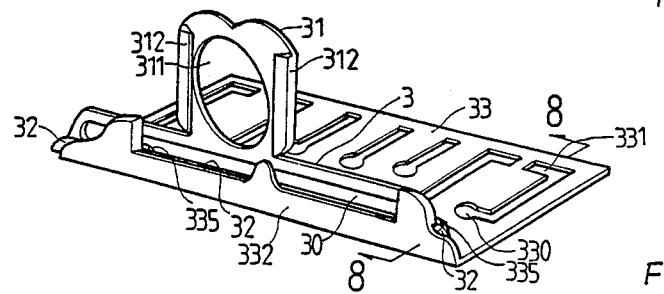
FIG. 7 is a perspective view of the combining frame combined together with the bottom plate in accordance with the present invention.
Figure 8:
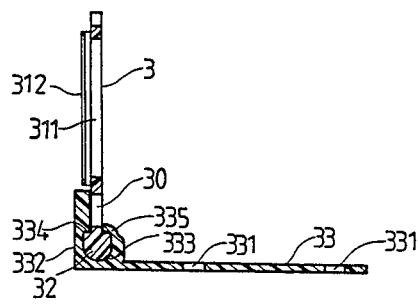
FIG. 8 is a cross-sectional view on line 8—8 of FIG. 7.
Figure 11:
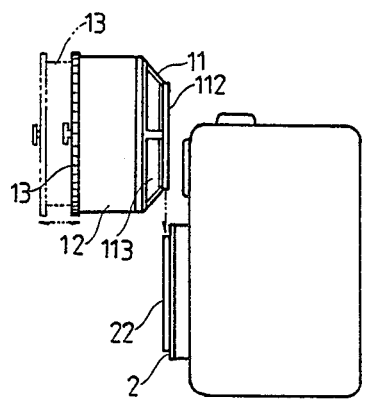
FIG. 11 is a side view of the lens base to be set on a compact automatic camera without a self-timer in accordance with the present invention.

The connecting base 2 shown in FIGS. 4 and 5 is to be used for combining the lens base 1 with a compact camera (see FIG. 11) which is not provided with a self-timer, and provided with a central round hole 21 and two parallel inserting grooves 22 for being inserted by the parallel protruding edges 112 of the guiding ring 11. The rear face 23 of the connecting base 2 is to be stuck with a SCOTCH (trademark) tape on the circumference of the lens ring of the compact camera.

The combining frame 3 and the bottomplate 33 have to be used for combining the lens base 1 with a compact camera (see FIG. 12) which is provided with a self-timer. The combining frame 3 is provided with a connecting plate 31 for combining with the guiding ring 11. The connecting plate 31 has a central round hole 311 and two parallel inserting grooves 312 for inserting the parallel protruding edges 112 for combining the lens base 1 together with the plate 31. The lens base 1 is able to move up or down staying at any position by mutual close contact with edges 112. The combining frame 3 is also provided with a horizontal rod 32 whose crosssection has a square upper edge and a semicircular lower edge for combinating with the bottom plate 33 with a positioning function. The bottom plate 33 is provided with a plurality of regular or irregular slots 331 selectable for combining with various cameras of different sizes, a vertical wall 332 at the front edge for the combining frame 3 to rest against when it is combined with the bottom plate 33, and a curved guiding groove 333 inside along the vertical wall 332 for the horizontal rod 32 to insert and slide therein. Besides, a square edge 334 provided at the inner side of the vertical wall 332 and two rod supporters 335 at the edge of the guiding groove can support said frame 3 to stand upright in using the lens base 1. The position of said frame 3 can be changed by sliding the horizontal rod 32 in the guiding groove 333 leftward or rightward and said frame 3 can be stopped immovable by mutual close contact. In addition, two long narrow holes 30 are provided horizontally between the connecting plate 31 and the horizontal rod 32 so as not to hamper the automatic exposure metering window in a camera.

Figure 9:
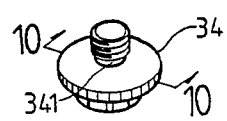
FIG. 9 is a perspective view of the fixing button in accordance with the present invention.
Figure 10:
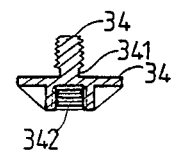
FIG. 10 is a cross-sectional view on line 10—10 of FIG. 9.
Figure 13:
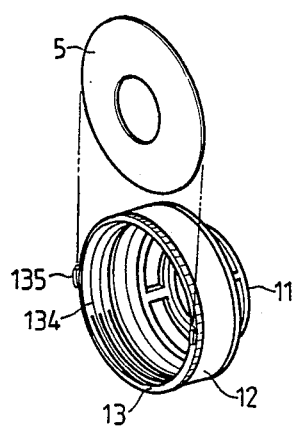
FIG. 13 is a perspective view of a color filter to be fitted on the lens base in accordance with the present invention.
Figure 14:
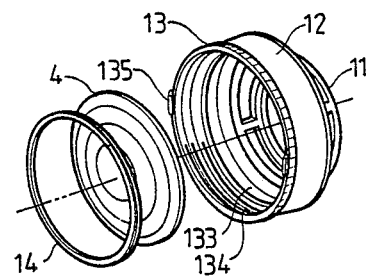
FIG. 14 is a view of a special lens to be fitted on the lens base in accordance with the present invention.

A fixing button 34 is for fixing tightly the bottom plate 33 just under a camera a having a tripod socket, penetrating one of the slots 331 in said plate 33 and screwing in said tripod socket. The fixing button 34 is provided with a smaller-diameter neck 341 than the width of the slots 331 as shown in FIGS. 9 and 10, and a threaded section with a larger diameter than the width of the slots 331. Each slot 331 has a larger end hole 330 abutting on the end of each slot for the threaded section of the fixing button 34 to penetrate through and for the smaller-diameter neck 341 to move to and fro in the slot 331. The fixing button 34 is also provided with a female-threaded hole at the lower section 342 for a tripod to combine with after said button 34 is fixed on a camera.

Now, the usage of this lens base 1 is to be described. In using this lens base 1 on a camera having female threads at the lens ring, the guiding ring 11 is not necessary and the outer cylindrical ring 12 is directly combined with the camera by screwing the male threads 121 or 122 with the female threads of the lens ring of the camera.

Figure 12:
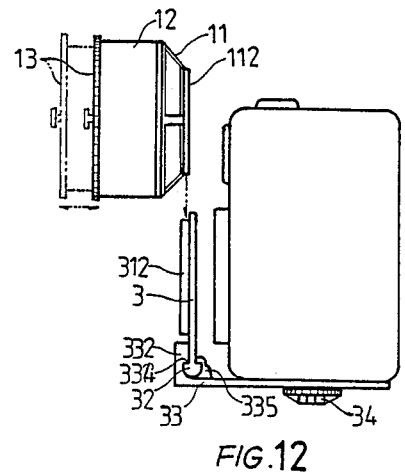
FIG. 12 is a view side of the lens base to be set on a compact automatic camera with a self-timer in accordance with the present invention.

In using this lens base 1 on a camera having a tripod socket but not said female threads on the lens ring, the combining frame 3 has to be combined with the bottom plate 33 by pushing the horizontal rod 32 in the guiding groove 331 such that said frame 3 stands up straight. Then the bottom plate 33 is to be fixed tightly under the camera with the fixing button 34 and the guiding ring 11 should be inserted in the connecting plate 31 of said frame 3, as shown in Figure 12.

Next, a special lens 4 or a color filter 5 has to be picked out for using on this lens base 1. The selected lens 4 should be put in the inner cylindrical ring 13 first and then the positioning ring 14 is to be combined with said ring 13 so as to keep the lens 4 in place for taking pictures. The color filter 5 is to be placed at the front end of said ring 13 between the two protrusions 135. The distance between the lens 4 or the color filter 5 and the lens of the camera can be micro-adjusted for taking pictures with a lot of different clearances or blur, by turning the inner cylindrical ring 13 inside the outer cylindrical ring 12.

What is claimed is:

1. A mounting arrangement for an automatic camera having a main lens, comprising:
   (a) connector means mounted on the camera, and including a connecting member having a central connector hole aligned along a longitudinal axis with the main lens of the camera and a pair of mutually parallel, elongated guide channels at opposite lateral sides of the central connector hole;

(b) a guiding ring including an end wall having a central guide hole aligned along the longitudinal axis with the connector hole, and a pair of guide projections insertable into, and slidable lengthwise along, the guide channels, said guide projections frictionally contacting the guide channels and being frictionally retained in a selected position along the guide channels, said guiding ring having a threaded open end opposite said end wall;

(c) an outer cylindrical ring having a threaded end section for threadedly engaging the threaded open end of the guiding ring, an opposite rim end section, a threaded idling section between the end sections, and a threaded intermediate section adjacent the idling section;

(d) an inner cylindrical ring having a threaded end portion for threadedly engaging the threaded intermediate section of the outer ring, an opposite threaded portion, and a handle portion for turning the inner ring about the longitudinal axis, said inner ring also having projecting arms for holding a photographic element in front of the main lens of the camera; and (e) a positioning ring threadedly engaging the opposite threaded portion of the inner ring, and retaining the photographic element in position on the inner ring.

2. The mounting arrangement according to claim 1, wherein the guiding ring has a generally frusto-conical shape, and has a side wall formed with side openings through which light passes.

3. The mounting arrangement according to claim 1, wherein the connecting member is a connecting base having a rear face that is adhesively secured on a camera part bounding the main lens.

4. The mounting arrangement according to claim 1, wherein the connecting member is a connecting plate; and wherein the connector means further includes a bottom plate, and means for fixing the bottom plate to a bottom part of the camera.

5. The mounting arrangement according to claim 4, wherein the connecting plate constitutes an upper portion of a combining frame, said combining frame having a lower guide portion; and wherein the bottom plate has a transverse elongated guide groove in which the lower guide portion of the combining frame is insertable and slidable lengthwise, said lower guide portion frictionally contacting the guide groove and being frictionally retained in a selected position along the guide groove.

6. The mounting arrangement according to claim 5, wherein the lower guide portion constitutes a rod having means for supporting the connecting plate in an upright orientation.

7. The mounting arrangement according to claim 6, wherein the combining frame has narrow transverse light-transmissive apertures between the rod and the connecting plate.

8. The mounting arrangement according to claim 6, wherein the rod has an upper square edge and a lower curved edge.

9. The mounting arrangement according to claim 4, wherein the bottom plate includes a plurality of elongated slots spaced apart of one another, and wherein the fixing means includes a turnable mounting member having a neck extending through a selected slot and a threaded stem for threadedly engaging a tripod socket in the camera.

10. The mounting arrangement according to claim 9, wherein each slot has an enlarged end through which the stem passes with clearance.

* * * * *